United States Patent
Kwon et al.

(10) Patent No.: US 9,414,395 B2
(45) Date of Patent: Aug. 9, 2016

(54) METHOD AND APPARATUS FOR ALLOCATING RESOURCES FOR COMMUNICATION BETWEEN BASE STATIONS IN AN IN-BAND COMMUNICATION SYSTEM

(71) Applicant: Samsung Electronics Co., Ltd., Gyeonggi-do (KR)

(72) Inventors: Sang-Wook Kwon, Gyeonggi-do (KR); Hyun-Jeong Kang, Seoul (KR); Jong-Hyung Kwun, Seoul (KR); Suk-Won Kim, Gyeonggi-do (KR); June Hwang, Incheon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/329,770

(22) Filed: Jul. 11, 2014

(65) Prior Publication Data

US 2015/0017992 A1   Jan. 15, 2015

(30) Foreign Application Priority Data

Jul. 12, 2013 (KR) .......................... 10-2013-0082492

(51) Int. Cl.
*H04W 36/00* (2009.01)
*H04W 72/08* (2009.01)
(Continued)

(52) U.S. Cl.
CPC ............ *H04W 72/082* (2013.01); *H04W 36/30* (2013.01); *H04W 72/0426* (2013.01); *H04W 84/047* (2013.01)

(58) Field of Classification Search
CPC .......... H04W 36/0072; H04W 72/082; H04W 72/0426; H04W 84/047; H04W 88/02; H04W 88/08; H04W 36/30; H04W 36/04; H04W 72/04; H04W 72/0446; H04W 28/04; H04M 1/72519; H04L 47/10
USPC ...................... 455/437, 550.1, 561, 452, 450; 370/329, 252, 336
See application file for complete search history.

(56) References Cited

U.S. PATENT DOCUMENTS 5,970,410 A    10/1999   Carney et al.
8,626,182 B2   1/2014    Kwon et al.
(Continued)

FOREIGN PATENT DOCUMENTS

KR   10-2010-0096325 A    9/2010
WO   WO 2012/044444 A1    4/2012

OTHER PUBLICATIONS

International Search Report dated Sep. 22, 2014 in connection with International Application No. PCT/KR2014/006206; 3 pages.
(Continued)

*Primary Examiner* — Allahyar Kasraian
*Assistant Examiner* — Farid Seyedvosoghi

(57) ABSTRACT

A method and apparatus for allocating resources for communication between Base Stations (BSs) in an in-band communication system can be provided by a BS. A method for allocating resources for communication between BSs, performed by a Mobile Station (MS) in an in-band communication system includes receiving information about an interference-free expected area from a BS communicating with the MS through an access link, transmitting to the BS feedback information indicating whether the MS is located in the interference-free expected area based on the information about the interference-free expected area, receiving from the BS a message requesting measurement of a fronthaul link for communication between BSs based on the feedback information, and transmitting a measurement result of the fronthaul link to the BS.

20 Claims, 7 Drawing Sheets

(51) Int. Cl.
*H04W 36/30* (2009.01)
*H04W 72/04* (2009.01)
*H04W 84/04* (2009.01)

(56) References Cited

U.S. PATENT DOCUMENTS

| | | | |
|---|---|---|---|
| 8,681,660 B2* | 3/2014 | Xu et al. | 370/255 |
| 8,694,043 B2* | 4/2014 | Racz et al. | 455/522 |
| 2010/0091745 A1* | 4/2010 | Bevan et al. | 370/338 |
| 2010/0216486 A1 | 8/2010 | Kwon et al. | |
| 2011/0007689 A1* | 1/2011 | Shen et al. | 370/328 |
| 2011/0256833 A1 | 10/2011 | Racz et al. | |
| 2013/0033989 A1 | 2/2013 | Barbieri et al. | |
| 2013/0044621 A1 | 2/2013 | Jung et al. | |
| 2013/0155990 A1* | 6/2013 | Nishio | H04L 5/0053 370/329 |
| 2013/0170360 A1 | 7/2013 | Xu et al. | |
| 2015/0017999 A1* | 1/2015 | Chen | H04W 16/14 455/452.1 |

OTHER PUBLICATIONS

Written Opinion of International Searching Authority dated Sep. 22, 2014 in connection with International Application No. PCT/KR2014/006206; 5 pages.

\* cited by examiner

METHOD AND APPARATUS FOR ALLOCATING RESOURCES FOR COMMUNICATION BETWEEN BASE STATIONS IN AN IN-BAND COMMUNICATION SYSTEM

CROSS-REFERENCE TO RELATED APPLICATION(S) AND CLAIM OF PRIORITY

The present application is related to and claims the benefit under 35 U.S.C. §119(a) of a Korean patent application filed in the Korean Intellectual Property Office on Jul. 12, 2013 and assigned Serial No. 10-2013-0082492, the entire disclosure of which is incorporated herein by reference.

TECHNICAL FIELD

The present disclosure relates generally to a method and apparatus for allocating resources for communication between Base Stations (BSs) in a communication system, and more particularly, to a method and apparatus for allocating resources for in-band communication between BSs on a fronthaul link.

BACKGROUND

In a communication system, a BS may be connected to another BS or a GateWay (GW) through a backhaul link by point-to-point communication. The backhaul link refers to a communication link established between BSs by point-to-point through a core network. For communication on the backhaul link, a hardware device needs to be installed in each BS.

The above information is presented as background information only to assist with an understanding of the present disclosure. No determination has been made, and no assertion is made, as to whether any of the above might be applicable as prior art with regard to the present disclosure.

SUMMARY

To address the above-discussed deficiencies, the present disclosure provides a method and apparatus for allocating resources for communication between Base Stations (BSs), taking into account interference that a fronthaul link causes to an access link in an in-band communication system.

Certain embodiments of the present disclosure provide a method and apparatus for allocating resources for in-band communication between BSs such that a fronthaul link causes minimal interference to an access link in an in-band communication system.

The present disclosure provides a method for allocating resources for communication between BSs, performed by an MS in an in-band communication system. The method includes receiving information about an interference-free expected area from a BS communicating with the MS through an access link; transmitting to the BS feedback information indicating whether the MS is located in the interference-free expected area based on the information about the interference-free expected area; receiving from the BS a message requesting measurement of a fronthaul link for communication between BSs based on the feedback information; and transmitting a measurement result of the fronthaul link to the BS.

The present disclosure provides a MS for allocating resources for communication between BSs in an in-band communication system. The MS includes a transceiver for transmitting and receiving data to and from a BS through an access link. The MS includes a controller for controlling: reception of information about an interference-free expected area from the BS; transmission of feedback information indicating whether the MS is located in the interference-free expected area based on the information about the interference-free expected area to the BS; reception of a message requesting measurement of a fronthaul link for communication between BSs based on the feedback information from the BS; and transmission of a measurement result of the fronthaul link to the BS.

Certain embodiments of the present disclosure provide a method for allocating resources for communication between BSs, performed by a BS, in an in-band communication system. The method includes transmitting information about an interference-free expected area to MSs within a service area, receiving from the MSs feedback information indicating whether the MSs are located in the interference-free expected area based on the information about the interference-free expected area; transmitting a message requesting measurement of a fronthaul link for communication between BSs to at least one MS determined to be located in the interference-free expected area based on the feedback information; and receiving a measurement result of the fronthaul link from the at least one MS.

The present disclosure provides a BS for allocating resources for communication between BSs in an in-band communication system. The BS includes: a first communication interface for transmitting and receiving data to and from another BS through a fronthaul link; and a second communication interface for transmitting and receiving data to and from MSs within a service area through access links. The BS includes a controller for controlling: transmission of information about an interference-free expected area to the MSs; reception of feedback information indicating whether the MSs are located in the interference-free expected area based on the information about the interference-free expected area from the MSs; transmission of a message requesting measurement of the fronthaul link for communication between BSs to at least one MS determined to be located in the interference-free expected area based on the feedback information; and reception of a measurement result of the fronthaul link from the at least one MS.

Other aspects, advantages, and salient features of the disclosure will become apparent to those skilled in the art from the following detailed description, which, taken in conjunction with the annexed drawings, discloses embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components, and structures.

DETAILED DESCRIPTION

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system. The following description with reference to the accompanying drawings is provided to assist in a comprehensive understanding of embodiments of the disclosure as defined by the claims and their equivalents. It includes various specific details to assist in that understanding but these are to be regarded as merely examples. Accordingly, those of ordinary skilled in the art will recognize that various changes and modifications of the embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of embodiments of the present disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Figure 1:
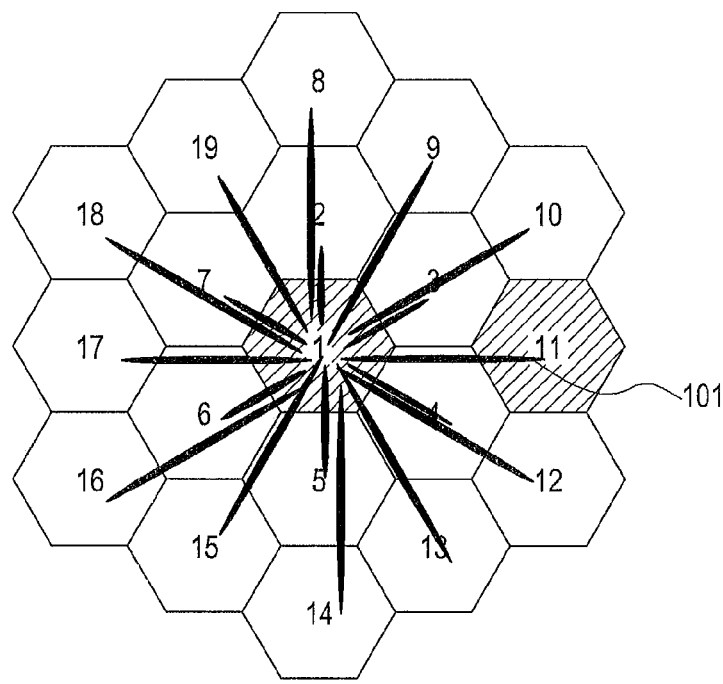
FIG. 1 illustrates an example of connecting Base Stations (BSs) by point-to-point in a general communication system according to the present disclosure.

FIG. 1 illustrates an example of BSs connected to each other by point-to-point in a general communication system.

Referring to FIG. 1, each BS may be connected to another BS through a backhaul link in a communication system. For example, a BS 1 and a BS 11 are connected through a backhaul link 101. If two BSs are connected by point-to-point, each of the BSs uses different hardware. For example, the BS 1 needs 18 hardware devices to connect to other 18 3-tier BSs by point-to-point. In-band communication is a communication scheme in which the same resources are used for an access link between a Mobile Station (MS) and a BS and a fronthaul link between BSs in a communication system. Fronthaul-link communication is conducted directly between the BSs without the intervention of a core network.

Figure 2:
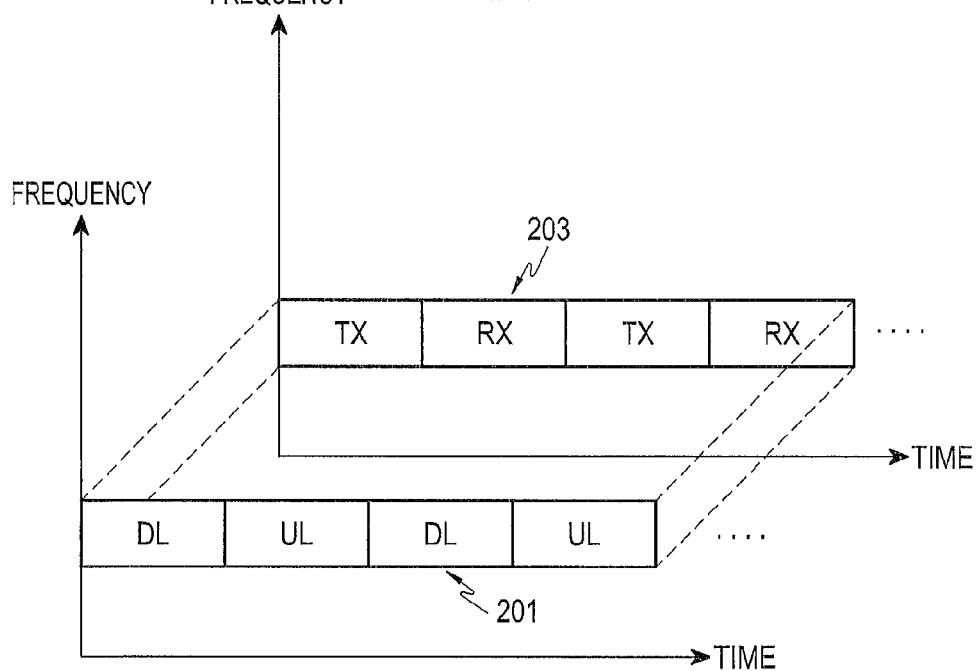
FIG. 2 illustrates an example referred to for describing resource allocation to an access link and a fronthaul link in an in-band communication system according to the present disclosure.

FIG. 2 illustrates a view referred to for describing resource allocation to an access link and a fronthaul link in an in-band communication system.

In FIG. 2, it is assumed that resources are allocated in Time Division Duplexing (TDD) in the in-band communication system. Referring to FIG. 2, the same resources are allocated to both the access link 201 and the fronthaul link 203. In-band communication advantageously allows a BS to reuse hardware used for an existing access link for a fronthaul link.

Further, since in-band communication does not require additional resources for the fronthaul link, it is favorable in terms of BS operations. FIG. 2 illustrates an example of allocating resources to an access link 201 and a fronthaul link 203. In FIG. 2, DL represents downlink resource allocation and UL represents uplink resource allocation. The access link 201 differs from the fronthaul link 203 in the following ways:

First, MS and a BS are nodes of the access link, whereas different BSs are nodes of the fronthaul link. Second, access-link communication is one-to-multi communication between a BS and multiple MSs, and fronthaul-link communication is one-to-one communication between BSs. Third, the fronthaul link can deliver a signal farther than the access link.

However, in-band communication may cause interference between the access link and the fronthaul link because the same resources are used simultaneously on the access link 201 and the fronthaul link 203.

Figure 3:
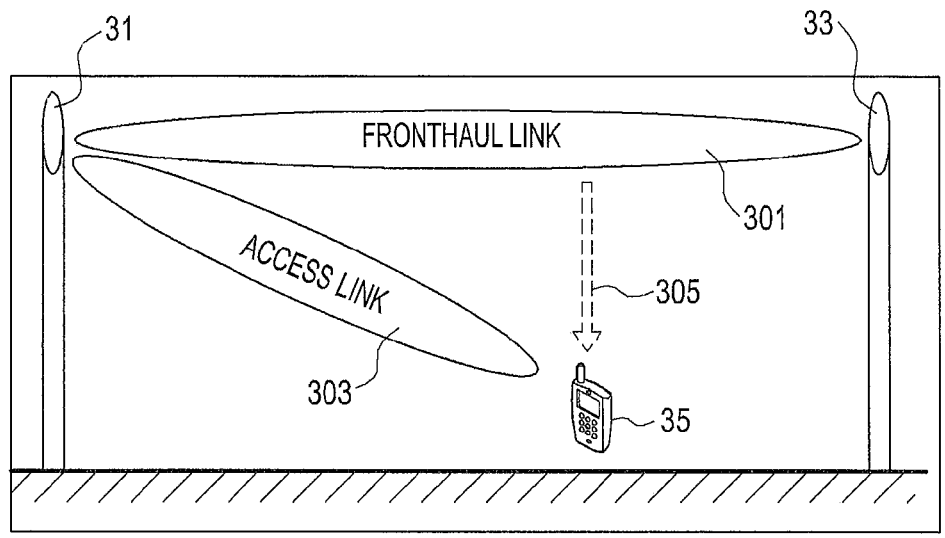
FIG. 3 illustrates an example referred to for describing interference between a fronthaul link and an access link, when resources are allocated for in-band communication according to the present disclosure.

FIG. 3 illustrates a view referred to for describing interference between an access link and a fronthaul link, when resources are allocated for in-band communication.

Referring to FIG. 3, it is assumed that a BS 31 and a BS 33 are connected through a fronthaul link 301, and the BS 31 and MS 35 are connected through an access link 303. If the same resources are allocated to the fronthaul link 301 and to the access link 303, and if transmission takes place simultaneously on the fronthaul link 301 and the access link 303, then for in-band communication, the fronthaul link 301 and the access link 303 interfere with each other.

Since the propagation distance of the fronthaul link 301 is generally longer than that of the access link 303, the BS 31 allocates more transmission power to the fronthaul link 301 than to the access link 303. Accordingly, the interference that the fronthaul link 301 causes to the access link 303 is more degrading than the interference that the access link 303 causes to the fronthaul link 301. Moreover, the MS 35 has difficulty in successfully decoding a signal received through the access link 303 due to the interference from the fronthaul link 301.

Embodiments of the present disclosure provide a method and apparatus for allocating resources such that when resources are allocated to an access link between a Mobile Station (MS) and a Base Station (BS) and a fronthaul link for in-band communication between BSs, the fronthaul link may cause minimal interference to the access link in a communication system.

According to certain embodiments of the present disclosure, for this purpose, a BS transmits, to an MS, information about an area expected to experience an interference from a fronthaul link less than a predetermined threshold (that is, an area expected to experience a relatively small interference) (this area will be referred to as an interference-free expected area) or information about an area expected to experience an interference from the fronthaul link at an usual level (this area will be referred to as an interference expected area). Upon receipt of the information about the interference-free expected area or the information about the interference expected area, the MS periodically reports to the BS whether the MS is located in the interference-free expected area or the interference expected area.

According to certain embodiments of the present disclosure, in the presence of data to be transmitted through a fronthaul link, the BS indicates measurement of the fronthaul link to at least one MS that is determined to be located in the interference-free expected area based on feedback information received from the MS and allocates resources for in-band communication based on the measurement. The foregoing resource allocation method of the present disclosure can minimize interference that a fronthaul link causes to an access link during in-band communication between BSs.

Now a detailed description will be given of a resource allocation method for in-band communication between BSs according to embodiments of the present disclosure with reference to FIGS. 4 to 11.

During in-band communication between two BSs, a fronthaul link interferes with an access link. A specific limited area is expected to experience the interference. Since the two BSs are fixed and the fronthaul link is established between the two BSs, the pattern of beams formed for transmission on the fronthaul link is not changed. Accordingly, a constant beam pattern is created and a service area is divided into an interference-free expected area and an interference expected area according to the beam pattern.

According to certain embodiments of the present disclosure, a BS transmits information about an interference-free expected area to an MS. If the MS is located in the interference-free expected area, the MS transmits to the BS feedback information indicating that the MS is located in the interference-free expected area. The BS then determines, based on the feedback information received from the MS, whether to allocate the same resources to a fronthaul link and an access link, for in-band communication.

Figure 4:
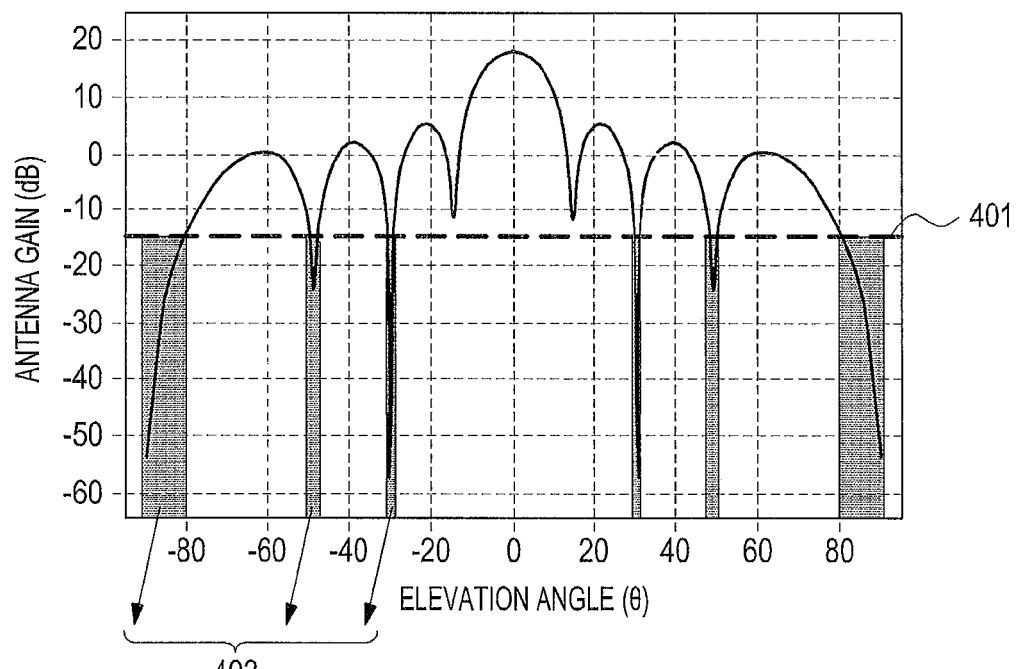
FIG. 4 illustrates an example referred to for describing a method for determining an interference-free expected area to allocate resources for in-band communication according to embodiments of the present disclosure.

FIG. 4 illustrates an example referred to for describing a method for determining an interference-free expected area to allocate resources for in-band communication according to embodiments of the present disclosure. The graph of FIG. 4 illustrates antenna gains with respect to beam patterns in which a BS transmits signals on a fronthaul link through an antenna array.

Referring to FIG. 4, the vertical axis represents an antenna gain of the fronthaul link and the horizontal axis represents an elevation angle of an antenna. Reference numeral 401 refers to a threshold for antenna gains according to a beam pattern for the fronthaul link. The threshold 401 is preset to a value at which the fronthaul link is expected to interfere little. Two BSs with the fronthaul link established in between determine antenna gains according to their respective beam patterns. The antenna gains can be calculated by a known method. Reference numeral 403 refers to a deep region of antenna gains. If the antenna gain of a fronthaul-link signal falls into the deep region 403 lower than the threshold 401, the BS determines an area corresponding to the deep region 403 in its service area to be an interference-free expected area.

According to embodiments of the present disclosure, information about an interference-free expected area can be represented as information about the latitude, longitude, and radius of the interference-free expected area. In certain embodiments of the present disclosure, information about an interference-free expected area can be represented using an area Identifier (ID) identifying the interference-free expected area or predetermined location information such as the coordinates of the interference-free expected area.

The BS broadcasts information about the interference-free expected area determined according to the embodiment of FIG. 4 to MSs within the service area. Upon receipt of the information about the interference-free expected area, each MS periodically or aperiodically transmits to the BS feedback information indicating whether the MS is located in the interference-free expected area. The information about the interference-free expected area can be transmitted to MSs that have been initially connected to the BS. The BS identifies MSs located in the interference-free expected area, indicates measurement of the fronthaul link to at least one MS located in the interference-free expected area, receives a measurement result of the fronthaul link from the at least one MS, and allocates resources for in-band communication between BSs based on the measurement result.

Figure 5:
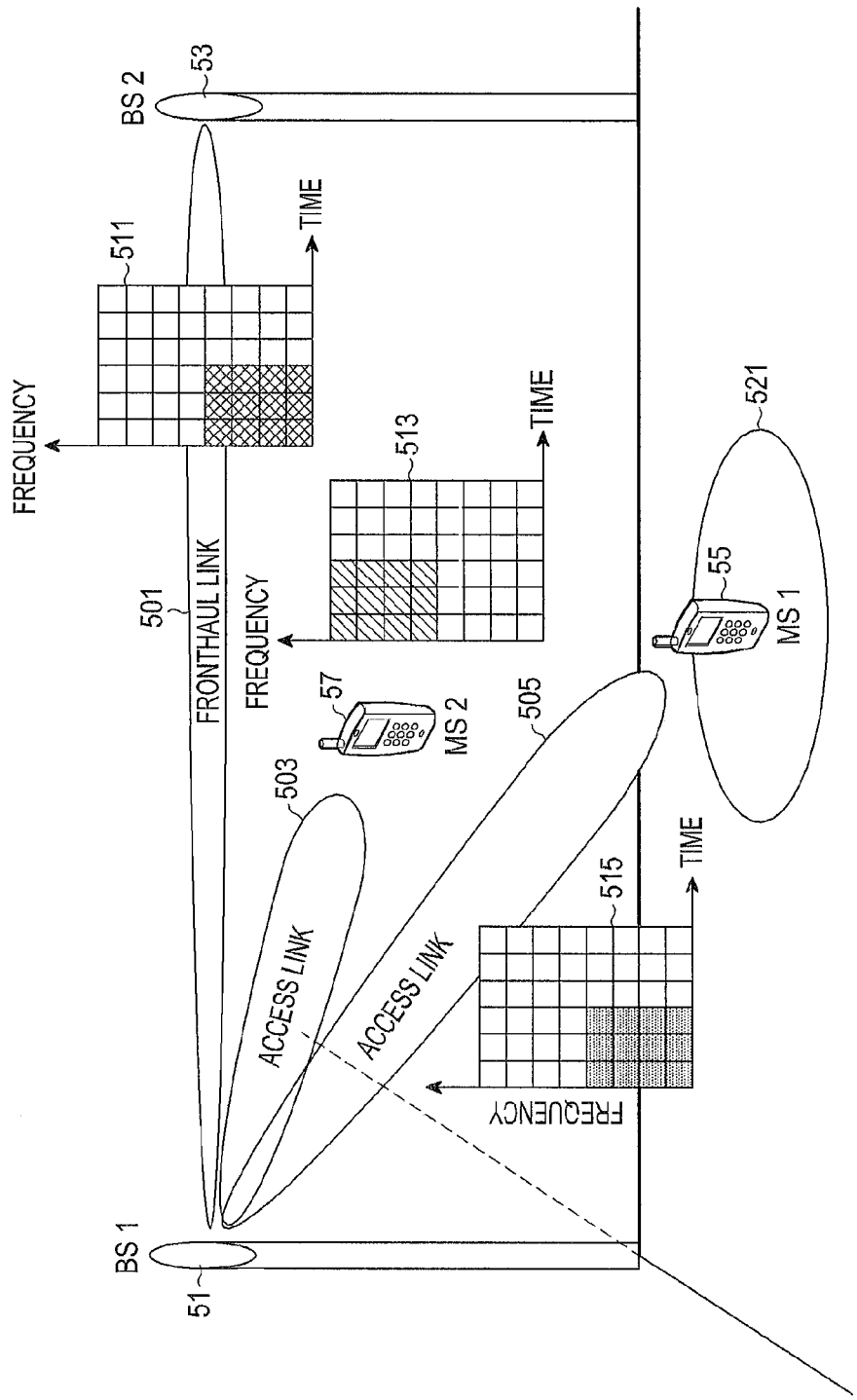
FIG. 5 illustrates an example referred to for describing a method for allocating resources for in-band communication according to embodiments of the present disclosure.

FIG. 5 illustrates an example referred to for describing a method for allocating resources for in-band communication according to embodiments of the present disclosure.

A BS determines whether to allocate resources for in-band communication by equation (1).

$$\frac{RSRP_{Access}}{RSRP_{Fronthaul}} > \beta \qquad (1)$$

where $RSRP_{Access}$ represents a Reference Signal Received Power (RSRP) of an access link and $RSRP_{Fronthaul}$ represents an RSRP of a fronthaul link. Each MS measures $RSRP_{Access}$ and $RSRP_{Fronthaul}$ and transmits the measured $RSRP_{Access}$ and $RSRP_{Fronthaul}$ to the BS. β is a system parameter used as a resource allocation parameter. If $RSRP_{Access}$ to $RSRP_{Fronthaul}$ ratio is larger than β, the BS allocates the same resources to both the access link and the fronthaul link. On the other hand, if the $RSRP_{Access}$ to $RSRP_{Fronthaul}$ ratio is equal to or less than β, the BS allocates different resources to the access link and the fronthaul link.

In FIG. 5, it is assumed that a first BS 51 (shown as BS 1) communicates with a second BS 53 (shown as BS 2) through a fronthaul link 501 and with two MSs 55 and 57 (shown as MS 1 and MS 2) through two respective access links 505 and 503. When the first BS 51 is to transmit a signal to the second BS 53 through the fronthaul link 501, the first BS 51 indicates measurement of the fronthaul link 501 to MS 55 (shown as MS 1) located in an interference-free expected area 521.

The first MS 55 transmits a measurement result $RSRP_{Fronthaul}$ of the fronthaul link 501 and a measurement result $RSRP_{Access}$ of the access link 505 to BS 51. The measurement results $RSRP_{Fronthaul}$ and $RSRP_{Access}$ can be transmitted to BS 51 simultaneously or separately according to their measurement time points. Upon receipt of the measurement results $RSRP_{Fronthaul}$ and $RSRP_{Access}$, BS 51 compares an $RSRP_{Access}$ to $RSRP_{Fronthaul}$ ratio with the threshold β. If the $RSRP_{Access}$ to $RSRP_{Fronthaul}$ ratio is larger than the threshold β, BS 51 allocates the same resources 511 and 515 to the fronthaul link 501 and the access link 505, as illustrated in FIG. 5.

In another embodiment of the present disclosure, MS 55 measures the fronthaul link 501 and the access link 505, and then transmits to BS 51 information indicating whether a ratio between the measurement results is larger than the threshold β. In this case, in determining that the ratio between the measurement results is larger than the threshold β based on the received information, BS 51 allocates the same resources 511 and 515 to the fronthaul link 501 and the access link 505, as illustrated in FIG. 5.

BS 51 allocates different resources 511 and 513 to the fronthaul link 501 and the access link 503 of MS 57 outside the interference-free expected area 521, that is, in an interference expected area.

According to the foregoing embodiment of the present disclosure, since the same resources 511 and 515 can be allocated to the fronthaul link 501 and the access link 505 of MS 51 located in the interference-free expected area 521, resources can be allocated efficiently.

Figure 6:
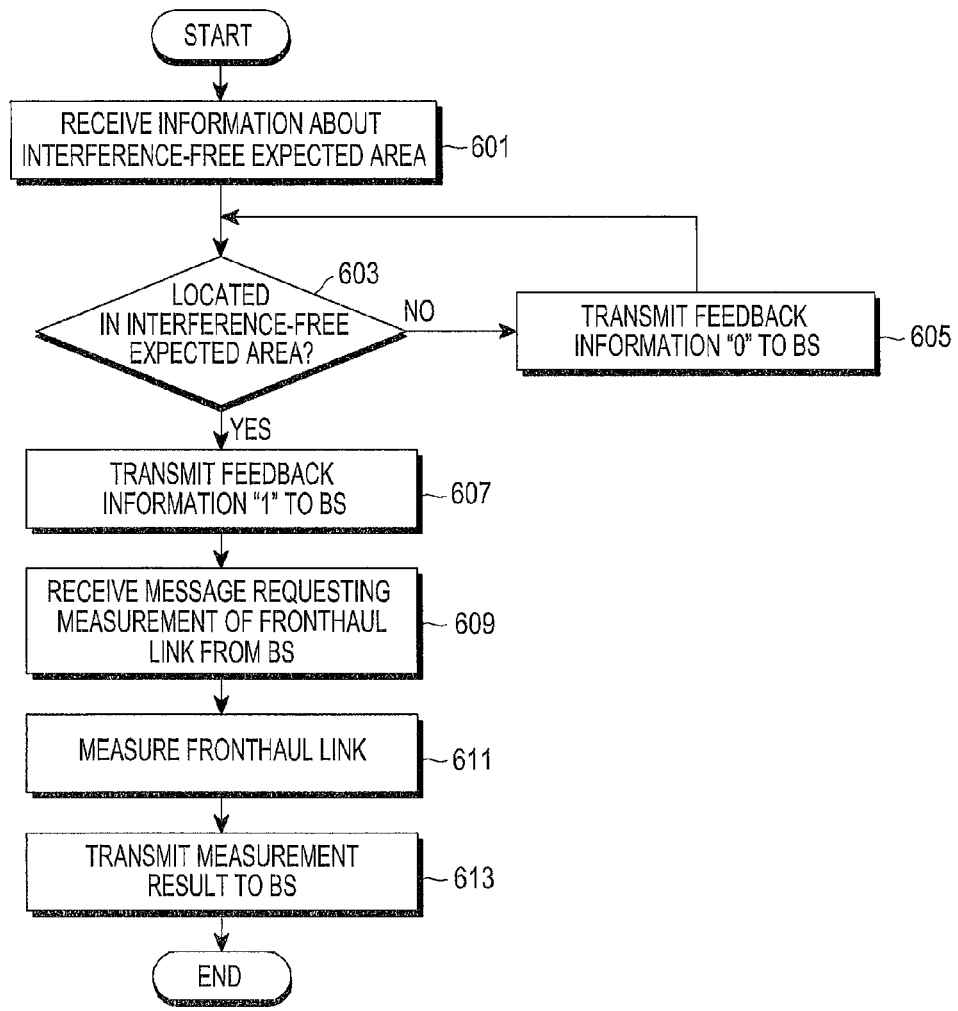
FIG. 6 illustrates a resource allocation method of a Mobile Station (MS), for communication between Base Stations (BSs) in an in-band communication system according to embodiments of the present disclosure.

FIG. 6 illustrates a resource allocation method of an MS, for communication between BSs in an in-band communication system according to embodiments of the present disclosure.

Referring to FIG. 6, the MS receives information about an interference-free expected area from a BS in operation 601. In operation 603, the MS determines whether it is located in the interference-free expected area and periodically or aperiodically transmits to the BS feedback information indicating whether the MS is located in the interference-free expected area or an interference expected area. If the MS is located in the interference expected area, the MS transmits feedback information set to, for example, "0" to the BS in operation 605. If the MS is located in the interference-free expected area, the MS transmits feedback information set to, for example, "1" to the BS in operation 607. Then upon generation of data to be transmitted through a fronthaul link in the BS, the MS receives a message requesting measurement of the fronthaul link from the BS in operation 609.

Upon receipt of the message requesting measurement of the fronthaul link, the MS measures the fronthaul link in operation 611 and transmits a measurement result to the BS in operation 613. The BS then allocates resources for in-band communication between BSs based on the measurement result received from the MS. In operation 613, the measurement result may also include a measurement result of an access link. In operation 613 the MS transmits, to the BS, information indicating whether a ratio between a fronthaul-link measurement result and an access-link measurement result is larger than the threshold β according to equation (1).

Figure 7:
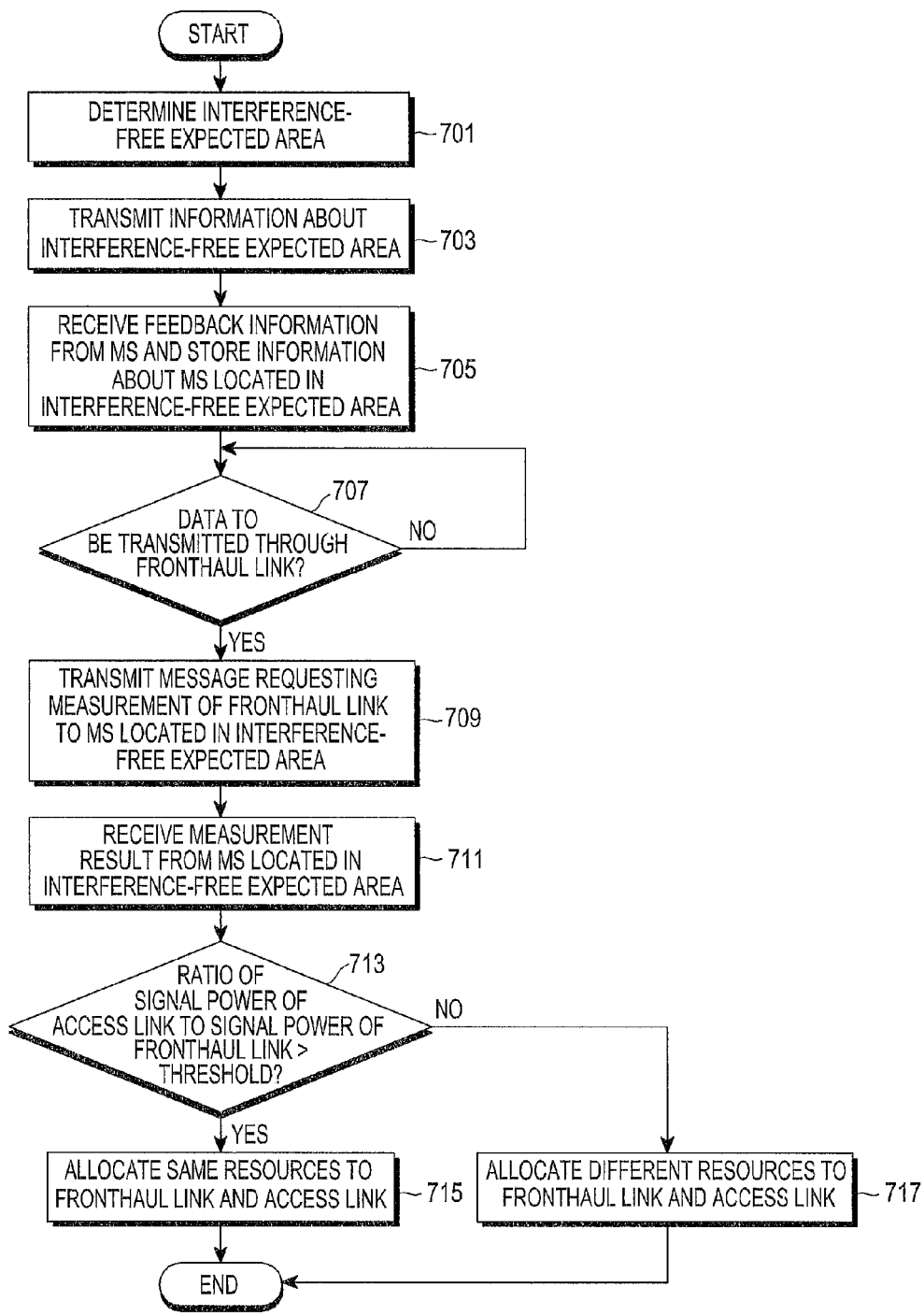
FIG. 7 illustrates a resource allocation method of a BS, for communication between BSs in an in-band communication system according to an embodiment of the present disclosure.

FIG. 7 illustrates a resource allocation method of a BS, for communication between BSs in an in-band communication system according to embodiments of the present disclosure.

Referring to FIG. 7, the BS determines an interference-free expected area having an antenna gain lower than a predetermined threshold (such as in the embodiment of FIG. 4) in operation 701. The antenna gain is achieved according to a beam pattern of a fronthaul link. In operation 703, the BS transmits information about the interference-free expected area to MSs within its service area. In operation 705, the BS receives, from MSs which have received the information about the interference-free expected area, feedback information indicating whether the MSs are located in the interference-free expected area and stores information about at least one MS located in the interference-free expected area.

Upon generation of data to be transmitted through the fronthaul link in operation 707, the BS transmits a message requesting measurement of the fronthaul link to the at least one MS that has been determined to be located in the interference-free expected area based on the information about the at least one MS in operation 709. In operation 711, the BS receives a measurement result from the at least one MS in the manner described with reference to the example of FIG. 5. The BS compares a ratio of an RSRP of an access link $RSRP_{Access}$ to an RSRP of the fronthaul link $RSRP_{Fronthaul}$ with a predetermined threshold (for example, a resource allocation parameter β) based on the measurement result. If the ratio is larger than the threshold, the BS allocates the same resources to the fronthaul link and the access link in operation 715. On the other hand, if the ratio is equal to or smaller than the threshold, the BS allocates different resources to the fronthaul link and the access link in operation 717. If the MS compares the ratio with the threshold in operation 713, the BS does not need perform operation 713.

Figure 8:
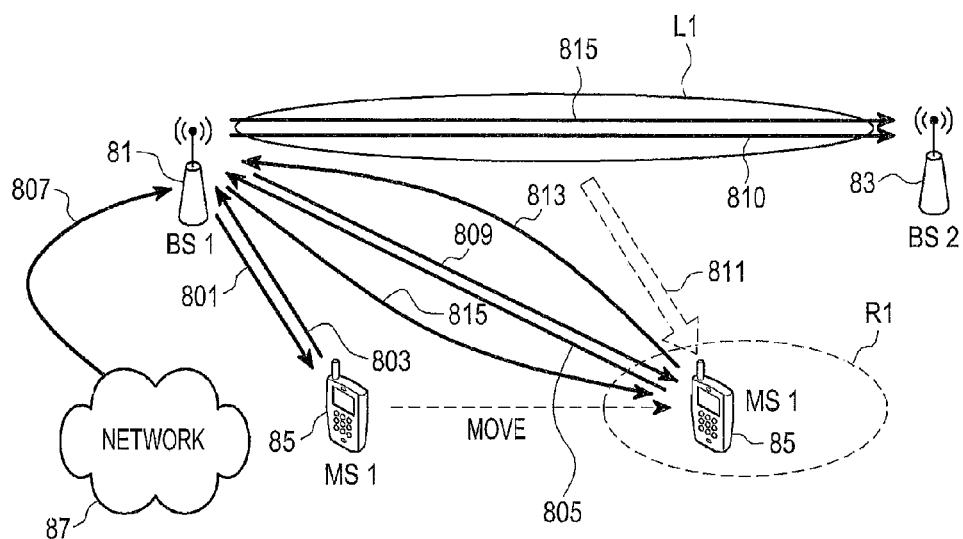
FIG. 8 is a state diagram illustrating an operation for allocating resources for communication between BSs in an in-band communication system according to embodiments of the present disclosure.

FIG. 8 is a state diagram illustrating an operation for allocating resources for communication between BSs in an in-band communication system according to embodiments of the present disclosure. Resources are allocated for in-band communication on a fronthaul link L1 between BSs 81 and 83 (BS 1 and BS 2) in FIG. 8.

Referring to FIG. 8, the BS 81 broadcasts system information including information about an interference-free expected area to an MS 85 (MS 1) in operation 801. In operation 803, when determining that the MS 85 is located in an interference expected area based on the information about the interference-free expected area, the MS 85 periodically transmits to the BS 81 feedback information set to, for example, 0 indicating that the MS 85 is located in the interference expected area. Subsequently, in operation 805 if the MS 85 moves to an interference-free expected area R1, the MS 85 determines that it is located in the interference-free expected area R1 based on the information about the interference-free expected area and periodically transmits to the BS feedback information set to, for example, 1 indicating that the MS 85 is located in the interference-free expected area R1. Upon receipt of the feedback information, the BS 81 stores information (for example, an MS ID) about the MS 85 located in the interference-free expected area R1.

Upon generation of data to be transmitted through the fronthaul link L1 in a network 87 or for any other reason in communication 807, the BS 81 transmits a message requesting measurement of the fronthaul link L1 to the MS 85 located in the interference-free expected area R1 in operation 809. Upon receipt of the message, the MS 85 prepares for measuring the fronthaul link L1. In operation 810, the BS 81 transmits a reference signal (RS) for measurement of the fronthaul link L1. According to the present disclosure, different RSs are used for measuring an access link and the fronthaul link L1. The MS 85 measures the RS set for measuring the fronthaul link L1 in operation 811.

In operation 813, the MS 85 transmits a measurement result of the fronthaul link L1 to the BS 81. The BS 81 compares a ratio of an RSRP of the access link $RSRP_{Access}$ to an RSRP of the fronthaul link L1 $RSRP_{Fronthaul}$ with a predetermined threshold using the received measurement result. If the ratio is larger than the threshold, the BS 81 allocates the same communication resources to the fronthaul link L1 for in-band communication and the access link between the BS 81 and the MS 85 in operation 815.

While a BS allocates resources for in-band communication by transmitting information about an interference-free expected area to an MS in the embodiment illustrated in FIG. 8, information about an interference expected area may be transmitted instead of the information about the interference-free expected area, for resource allocation for in-band communication in another embodiment of the present disclosure. In this case, the BS broadcasts system information including the information about the interference expected area to MSs. An MS, which determines that it is located in the interference expected area based on the information about the interference expected area, transmits to the BS periodically feedback information set to, for example, 0 indicating that the MS is located in the interference expected area.

In contrast, an MS, which determines that it is not located in the interference expected area (that is, it is located in the interference-free expected area) based on the information about the interference expected area, transmits to the BS periodically feedback information set to, for example, 1 indicating that the MS is not located in the interference expected area. Upon receipt of the feedback information set to 1, the BS stores information (for example, an MS ID) about the MS located in the interference-free expected area. The subsequent operation is performed according to the embodiment illustrated in FIG. 8.

In the embodiments of the present disclosure, an interference-free expected area is determined based on a beam pattern, with no regard to an actual environment. As a result, an interference-free area may exist in an interference area as well as the interference-free expected area based on the beam pattern. In this context, an interference-free expected area can be determined by Minimization of Driving Test (MDT). In the MDT, a measurement result of a serving cell or a neighbor cell is transmitted to a BS without a user manipulation or a request from the BS, thereby reducing the cost of a driving test for an MS. If the MDT is adopted, a condition for measuring a fronthaul link can be included in operation conditions for performing the MDT.

Figure 9:
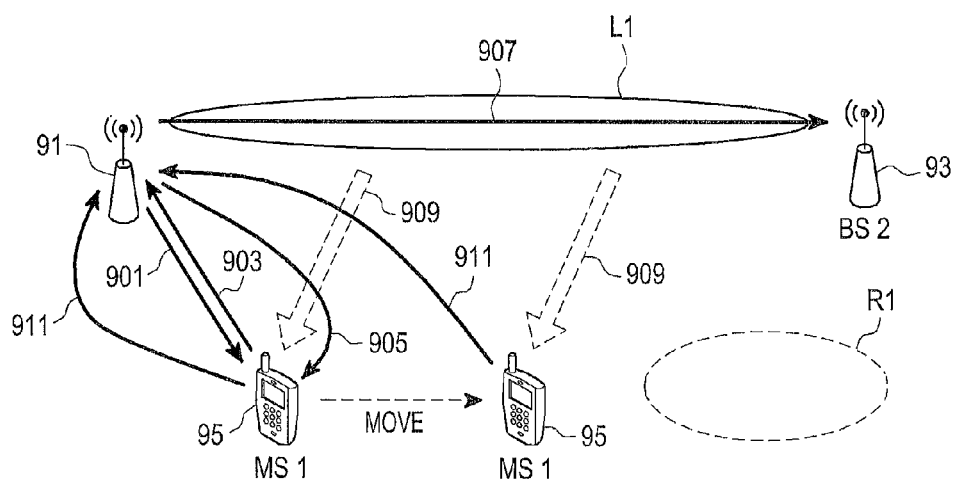
FIG. 9 illustrates an operation for measuring a fronthaul link by Minimization of Driving Test (MDT) according to an embodiment of the present disclosure.

FIG. 9 illustrates an operation for measuring a fronthaul link by MDT according to embodiments of the present disclosure.

Referring to FIG. 9, a BS 91 broadcasts system information including information about an interference-free expected area to a MS 95 (MS 1) in operation 901. In operation 903, the MS 95 periodically transmits to the BS 91 feedback information indicating whether the MS 95 is located in the interference expected area. If the MS 95 is not located in the interference-free expected area R1, the MS 95 feeds back a value "0" to the BS 91. In operation 905, the BS 91 transmits a message requesting periodic measurement of a fronthaul link L1 to the MS 95 in order to search for an interference-free expected area R1 not included in the beam pattern-based interference-free expected area R1. Upon receipt of the message, the MS 95 prepares for measuring the fronthaul link L1. In operation 907, the BS 91 transmits an RS for measurement of the fronthaul link L1. The MS 95 measures the RS in operation 909, and transmits a measurement result of the fronthaul link L1 to the BS 91 in operation 911. The BS 91 updates information about a new interference-free expected area based on the measurement result received from the MS 95. The operation illustrated in FIG. 9 can be performed by a plurality of MSs within a service area of the BS.

Figure 10:
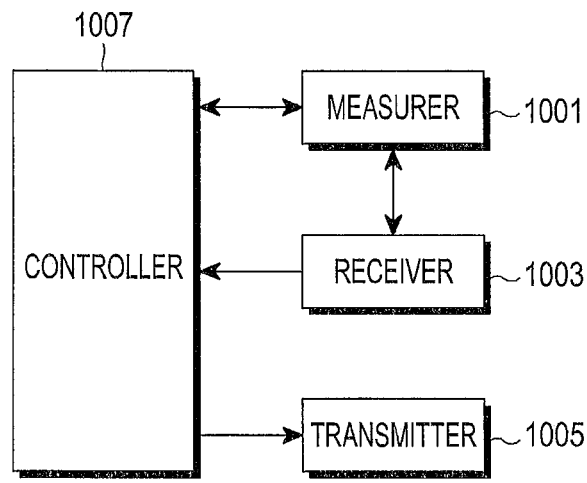
FIG. 10 illustrates a block diagram of an MS in a communication system supporting in-band communication between BSs according to an embodiment of the present disclosure.

FIG. 10 is a block diagram of an MS supporting in-band communication between BSs according to embodiments of the present disclosure.

Referring to FIG. 10, the MS includes a measurer 1001 for measuring a received signal strength of a wireless signal, a transceiver having a transmitter 1005 and a receiver 1003, for transmitting and receiving data through a wireless network, and a controller 1007 for controlling: reception of information about an interference-free expected area from a BS; transmission to the BS feedback information indicating whether the MS is located in the interference-free expected area based on the information about the interference-free expected area; reception of a message requesting measurement of a fronthaul link for communication between BSs based on the feedback information from the BS; and transmission of a measurement result of the fronthaul link to the BS according to the embodiments illustrated in FIGS. 4 to 9. The measurer 1001 can be incorporated in the controller 1007.

Figure 11:
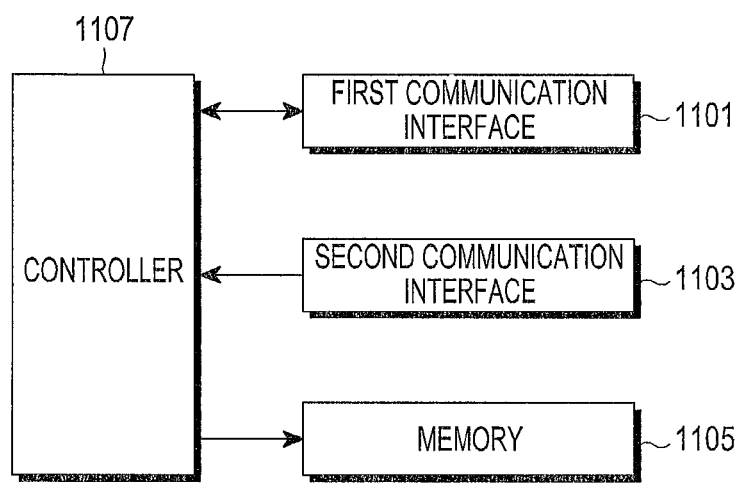
FIG. 11 illustrates a block diagram of a BS in a communication system supporting in-band communication between BSs according to an embodiment of the present disclosure.

FIG. 11 is a block diagram of a BS supporting in-band communication between BSs according to embodiments of the present disclosure.

Referring to FIG. 11, the BS includes a first communication interface 1101 for transmitting and receiving data to and from another BS through a fronthaul link, a second communication interface 1103 for transmitting and receiving data to and from MSs within a service area of the BS through access links, and a controller 1107 for controlling: transmission of information about an interference-free expected area to the MSs; reception of feedback information indicating whether the MSs are located in the interference-free expected area based on the information about the interference-free expected area from the MSs; transmission of a message requesting measurement of the fronthaul link for communication between the BSs to at least one MS determined to be located in the interference-free expected area based on the feedback information; reception of a measurement result of the fronthaul link from the at least MS; and allocation of resources to the fronthaul link according to the measurement result of the fronthaul link according to the embodiments illustrated in FIGS. 4 to 9.

The proposed method and apparatus for allocating resources for communication between base stations in an in-band communication system can be implemented as computer-readable code in a computer-readable recording medium. The computer-readable recording medium can include any kind of recording device storing computer-readable data. Examples of the recording medium include Read Only Memory (ROM), Random Access Memory (RAM), optical disk, magnetic tape, floppy disk, hard disk, non-volatile memory, and the like, and may also include the medium that is implemented in the form of carrier waves (for example, transmission over the Internet). In addition, the computer-readable recording medium can be distributed over the computer systems connected over the network, and computer-readable codes can be stored and executed in a distributed manner.

As is apparent from the foregoing description, the efficiency of radio resources can be increased by allocating resources to a fronthaul link and an access link in an in-band manner. No additional hardware is required for communication between BSs and a service can be provided dynamically or adaptively according to a link quality. Further, since direct communication is possible between BSs without the intervention of a core network, a service can be provided efficiently.

Although the present disclosure has been described with embodiments, various changes and modifications may be suggested to one skilled in the art. It is intended that the present disclosure encompass such changes and modifications as fall within the scope of the appended claims.

What is claimed is:

1. A method for allocating resources for communication between base stations (BSs), performed by a mobile station (MS), in an in-band communication system, the method comprising:
    receiving information about an interference-free expected area from a BS communicating with the MS through an access link, wherein a service area of the BS is divided into the interference-free expected area and an interference expected area;
    transmitting to the BS feedback information indicating whether the MS is located in the interference-free expected area based on the information about the interference-free expected area;
    receiving from the BS a message requesting measurement of a fronthaul link for communication between BSs based on the feedback information; and
    transmitting a measurement result of the fronthaul link to the BS.

2. The method of claim 1, wherein the information about the interference-free expected area is included in system information and broadcast by the BS.

3. The method of claim 1, further comprising: periodically transmitting the feedback information to the BS.

4. The method of claim 1, wherein when a ratio between a received signal power of the fronthaul link and a received signal power of the access link is greater than a predetermined threshold, the same resources are allocated to the access link and the fronthaul link for the in-band communication.

5. The method of claim 1, wherein the interference-free expected area has an antenna gain lower than a predetermined threshold, the antenna gain being achieved from a beam pattern generated for the fronthaul link.

6. A mobile station (MS) for allocating resources for communication between base stations (BSs) in an in-band communication system, the MS comprising:
    a transceiver configured to transmit data to and receive data from a BS through an access link; and
    a controller configured to control:
        reception of information about an interference-free expected area from the BS, wherein a service area of the BS is divided into the interference-free expected area and an interference expected area,
        transmission of feedback information indicating whether the MS is located in the interference-free expected area based on the information about the interference-free expected area to the BS,
        reception of a message requesting measurement of a fronthaul link for communication between BSs based on the feedback information from the BS, and
        transmission of a measurement result of the fronthaul link to the BS.

7. The MS of claim 6, wherein the information about the interference-free expected area is included in system information and broadcast by the BS.

8. The MS of claim 6, wherein the controller is further configured to control the transceiver to periodically transmit the feedback information to the BS.

9. The MS of claim 6, wherein when a ratio between a received signal power of the fronthaul link and a received signal power of the access link is larger than a predetermined threshold, the same resources are allocated to the access link and the fronthaul link for the in-band communication.

10. The MS of claim 6, wherein the interference-free expected area has an antenna gain lower than a predetermined threshold, the antenna gain being achieved from a beam pattern generated for the fronthaul link.

11. A method for allocating resources for communication between base stations (BSs), performed by a BS, in an in-band communication system, the method comprising:
    transmitting information about an interference-free expected area to mobile stations (MSs) within a service area, wherein the service area of the BS is divided into the interference-free expected area and an interference expected area;
    receiving, from each of the MSs, feedback information indicating whether the MS is located in the interference-free expected area based on the information about the interference-free expected area;
    transmitting a message requesting measurement of a fronthaul link for communication between BSs to at least one MS determined to be located in the interference-free expected area based on the feedback information; and
    receiving a measurement result of the fronthaul link from the at least one MS.

12. The method of claim 11, wherein the information about the interference-free expected area is included in system information and broadcast.

13. The method of claim 11, further comprising periodically receiving the feedback information.

14. The method of claim 11, further comprising: determining a resource allocation by when a ratio between a received signal power of the fronthaul link and a received signal power of an access link is larger than a predetermined threshold, allocating the same resources to the access link and the fronthaul link for the in-band communication.

15. The method of claim 11, wherein the interference-free expected area has an antenna gain lower than a predetermined threshold, the antenna gain being achieved from a beam pattern generated for the fronthaul link.

16. A base station (BS) for allocating resources for communication between BSs in an in-band communication system, the BS comprising:
    a first communication interface configured to transmit to and receive data from another BS through a fronthaul link;
    a second communication interface configured to transmit to and receive data from mobile stations (MSs) within a service area through access links, wherein the service area of the BS is divided into the interference-free expected area and an interference expected area; and a controller configured to control:
- transmission of information about an interference-free expected area to the MSs,
- reception of feedback information indicating whether the MSs are located in the interference-free expected area based on the information about the interference-free expected area from the MSs,
- transmission of a message requesting measurement of the fronthaul link for communication between BSs to at least one MS determined to be located in the interference-free expected area based on the feedback information, and
- reception of a measurement result of the fronthaul link from the at least one MS.

17. The BS of claim 16, wherein the information about the interference-free expected area is included in system information and broadcast.

18. The BS of claim 16, wherein the feedback information is received periodically.

19. The BS of claim 16, the controller is further configured to: upon determining when a ratio between a received signal power of the fronthaul link and a received signal power of an access link is larger than a predetermined threshold, allocate the same resources to the access link and the fronthaul link for the in-band communication.

20. The BS of claim 16, wherein the interference-free expected area has an antenna gain lower than a predetermined threshold, the antenna gain being achieved from a beam pattern generated for the fronthaul link.

* * * * *